United States Patent
Amtmann et al.

(10) Patent No.: US 7,603,090 B2
(45) Date of Patent: Oct. 13, 2009

(54) CIRCUIT FOR CONTRACTLESS DEVICE HAVING ACTIVE AND PASSIVE SEND MODES

(75) Inventors: Franz Amtmann, Graz (AT); Markus Harnisch, Graz (AT); Holger Kunkat, Graz (AT); Stefan Posch, Graz (AT)

(73) Assignee: NXP B.V., Eindhoven (NL)

( * ) Notice: Subject to any disclaimer, the term of this patent is extended or adjusted under 35 U.S.C. 154(b) by 634 days.

(21) Appl. No.: 10/554,382

(22) PCT Filed: Apr. 21, 2004

(86) PCT No.: PCT/IB2004/050475

§ 371 (c)(1),
(2), (4) Date: Oct. 25, 2005

(87) PCT Pub. No.: WO2004/098089

PCT Pub. Date: Nov. 11, 2004

(65) Prior Publication Data

US 2008/0096499 A1    Apr. 24, 2008

(30) Foreign Application Priority Data

Apr. 29, 2003  (EP) .................................. 03101168

(51) Int. Cl.
*H01Q 11/12* (2006.01)

(52) U.S. Cl. .................................. 455/127.5; 455/41.2

(58) Field of Classification Search ................. 455/41.2
See application file for complete search history.

(56) References Cited

U.S. PATENT DOCUMENTS

| | | | | |
|---|---|---|---|---|
| 6,462,647 B1 * | 10/2002 | Roz | ........................... | 340/10.1 |
| 6,982,747 B2 * | 1/2006 | Yamagishi | ................ | 348/211.1 |
| 2004/0201539 A1 * | 10/2004 | Yewen | ........................ | 343/867 |

FOREIGN PATENT DOCUMENTS

EP          1 280 099 A     1/2003

* cited by examiner

*Primary Examiner*—Duc Nguyen
*Assistant Examiner*—Zhiyu Lu (57) ABSTRACT

In a circuit (2) for a communication partner appliance (1) designed for contactless communication having two activatable send modes (ABM, PBM), which send modes (ABM, PBM) differ from one another with regard to their energy requirement, a determination stage (15) is provided, which is designed to determine first energy source information (SI1), which first energy source information (SI1) is characteristic of at least one parameter of at least one energy source (11, 12) serving to supply the circuit with electrical energy, and a decision stage (26) is additionally provided, which is designed to form a decision result taking account of the first energy source information (SI1) determined with the determination stage (15), which decision result influences which send mode (ABM, PBM) is to be activated in the circuit (2) of the communication appliance (1).

20 Claims, 3 Drawing Sheets

CIRCUIT FOR CONTRACTLESS DEVICE HAVING ACTIVE AND PASSIVE SEND MODES

The invention relates to a circuit for a first communication partner appliance designed for contactless communication, which first communication partner appliance belongs to a communication system comprising at least one second such communication partner appliance, in which circuit either an active send mode or a passive send mode may be activated.

The invention further relates to a communication partner appliance for contactless communication, which communication partner appliance comprises a circuit as described above in the first paragraph.

The invention further relates to a method of controlling a circuit, with regard to its send modes, which circuit is provided for a first communication partner appliance designed for contactless communication, which first communication partner appliance belongs to a communication system comprising at least one second such communication partner appliance, and in which circuit either an active send mode or a passive send mode may be activated.

Such a circuit of the type stated above in the first paragraph and such a communication partner appliance of the type stated above in the second paragraph, which comprises such a circuit, with which circuit such a method of the type stated above in the third paragraph may be performed, is known from the ECMA-340 standard in the version published in December 2002.

The known communication partner appliance is a so-called "Near Field Communication (NFC) Device" conformed to the ECMA-340 standard. This communication partner appliance comprises communication signal processing means realized with the aid of the circuit, wherein either an active send mode or a passive send mode may be activated. In the active send mode, a carrier signal generatable by means of the communication signal processing means may be used for sending communication. In order to provide sufficient electrical energy for the circuit when the active send mode is activated, a battery is connected to the circuit which provides a first energy source serving to supply the circuit. In the passive send mode, a carrier signal generated with a second communication partner appliance may be used for sending communication by means of the communication signal processing means. In order to provide sufficient electrical energy for the circuit when the passive send mode is activated, the circuit comprises supply voltage generating means, which are designed to generate a supply voltage for the circuit using the carrier signal generated by a second communication partner appliance and which provide a second energy source serving to supply the circuit.

In the case of the known communication partner appliance or in the case of its known circuit or in the case of the known method, the problem arises that, with sending communication according to the ECMA-340 standard, one of the two send modes is activated at the start of communication, whereby the energy consumption of the circuit is defined as virtually invariable for an entire communication sequence. However, this may possibly result in such a communication sequence being terminated prematurely and especially unintentionally, because insufficient electrical energy is available at the respective energy source for the respectively activated communication mode, since the two send modes of the circuit each cause individual energy consumption, which individual energy consumption has to be covered by the respective energy source.

The object of the invention is to eliminate the above-stated problems arising with a circuit of the type stated above in the first paragraph and with a communication partner appliance of the type stated above in the second paragraph and with a method of the type stated above in the third paragraph and to provide an improved circuit and an improved communication partner appliance and an improved method.

To achieve the above-mentioned object, features according to the invention are provided for a circuit according to the invention, such that a circuit according to the invention may be characterized in the following way, namely:

A circuit for a first communication partner appliance designed for contactless communication, which first communication partner appliance belongs to a communication system comprising at least one second such communication partner appliance, in which circuit either an active send mode or a passive send mode may be activated and wherein the circuit comprises terminal means, which are provided to transmit carrier signals usable for contactless communication, and wherein the circuit comprises communication signal processing means, with which communication signal processing means a carrier signal generated with the communication signal processing means may be used for sending communication when the active send mode is activated, and with which communication signal processing means a carrier signal generated with a second communication partner appliance and received by the circuit via the terminal means may be used for sending communication when the passive send mode is activated, and wherein the circuit comprises determination means, which are designed to determine first energy source information, which first energy source information is characteristic of at least one parameter of at least one energy source serving to supply the circuit with electrical energy, and wherein the circuit comprises decision means, which are designed to form a decision result taking account of the first energy source information determined using the determination means, which decision result influences which send mode is to be activated in the circuit of the first communication partner appliance.

To achieve the above-stated object, a communication partner appliance according to the invention is provided with a circuit according to the invention.

To achieve the above-mentioned object, features according to the invention are provided for a method according to the invention, such that a method according to the invention may be characterized in the following way, namely:

A method of controlling a circuit with regard to its send modes, which circuit is provided for a first communication partner appliance designed for contactless communication, which first communication partner appliance belongs to a communication system comprising at least one second such communication partner appliance, and which circuit comprises terminal means which are provided to transmit carrier signals usable for contactless communication, and in which circuit either an active send mode or a passive send mode may be activated, in which active send mode a carrier signal that can be generated by communication signal processing means of the circuit may be used for sending communication by means of the communication signal processing means and in which passive send mode a carrier signal received by the circuit may be used for sending communication, wherein first energy source information is determined, which first energy source information is characteristic of at least one parameter of at least one energy source serving to supply the circuit with electrical energy, and wherein a decision result is formed taking account of the determined first energy source information, which decision result influences which send mode is to be activated in the circuit of the first communication partner appliance.

By providing the measures according to the invention, the advantage is achieved, both for a circuit and for a communication partner appliance as well as for a method according to the invention, that the send mode of the circuit of the communication partner appliance may be selected, after initiation of a communication sequence between two such communication partner appliances, as a function of the energy supply conditions for the circuit, such that, as a function of at least one parameter of the energy source provided for supplying the circuit, the send mode most favorable in the particular instance may be activated. In this way, advantageous mode management is achieved for sending communication, whereby operating reliability is improved considerably in the case of sending communication.

In the solutions according to the invention, other features may be additionally provided. In this way, the advantage is achieved that the energy value actually available for the circuit is included in the decision result relating to the send mode to be activated.

In the solutions according to the invention, other features may be additionally provided. In this way, the advantage is achieved that the type of energy source actually available for the circuit or the available information, associated inseparably therewith, relating to the type of energy supply, such as for example line supply or separate-source supply by means of the carrier signal of a second communication partner appliance or autonomous supply by means of a battery, is included in the decision result. In this way, the advantage is additionally achieved that a relatively reliable prediction relating to the future availability of energy for the circuit of the first communication partner appliance is also included in the decision result by taking account of the type of energy source.

In the solution according to the invention, other features may be additionally provided. In this way, the advantage is achieved that parameters from all the energy sources present in the entire communication system may be included in the decision result, whereby a further positive contribution to operating reliability during sending communication is obtained, because the operating mode management for the circuit is based on system-wide energy source information.

In the solutions according to the invention, other features may be additionally provided. In this way, the advantage is achieved that the energy value actually available for at least one second communication partner appliance is included in the decision result.

In the solutions according to the invention, other features may be additionally provided. In this way, the advantage is achieved that the type of energy source actually available for at least one second communication partner appliance or the information, associated inseparably therewith, relating to the type of energy supply, such as for example line supply or separate-source supply by means of the carrier signal of a second communication partner appliance or autonomous supply by means of a battery, is included in the decision result. In this way, the advantage is additionally achieved that a relatively reliable prediction relating to the future availability of energy for the circuit of the second communication partner appliance is included in the decision result by taking account of the type of energy source.

In the solutions according to the invention, the decision result relating to the send mode to be activated may for example be reached wholly autonomously with the circuit. However, in the solutions according to the invention, other features may be additionally provided. In this way, the advantage is achieved that at least one second communication partner appliance is informed of the send mode to be activated according to the decision result in the circuit of the first communication partner appliance and may optionally also adjust its send mode on the basis of this information. In this way, it is possible, for example, for the communication partner appliance less well supplied with energy to change from its active send mode into its passive send mode if the active send mode is activated in each case in the circuits of two communication partner appliances. In this way, it is additionally possible, for example, for both communication partner appliances to change their send modes and consequently for a role reversal to take place with regard to the generation of the carrier signal required for sending communication if the one communication partner appliance is in active send mode and the other communication partner appliance is in passive send mode.

In the solutions according to the invention, it is possible, for example, for the send mode to be changed directly, i.e. without termination and subsequent restart of a communication protocol, as a consequence of the decision result. This is particularly advantageous when this change in send mode is taken into account in the other communication partner appliance by means of a communication protocol or a command of the communication protocol. This may additionally also be advantageous when the two communication appliances or their circuits are designed in such a way that such a change is processed in an error-free manner. However, in the solutions according to the invention, other features may be additionally provided. In this way, the advantage is achieved that a change in send mode may be effected reliably and in well-defined manner, in particular also using a communication protocol, such as for example in accordance with the ECMA-340 standard, with which a change in send mode "on the fly" during a communication sequence with this communication protocol would not be successful.

In a solution according to the invention, other features may be additionally provided. In this way, the advantage is achieved that, even when no change in send mode is required in the circuit of the one communication partner appliance but a change in send mode is necessary in the circuit of the other communication partner appliance, termination and subsequent restart of the communication protocol may be performed, as has to occur in the case of the communication protocol according to the ECMA-340 standard, in order to be able to continue a communication sequence successfully once the change of send mode has been performed in the circuit of the other communication partner appliance.

In the case of a communication partner appliance according to the invention, the advantages stated above in relation to the circuit according to the invention are likewise achieved.

The above-stated aspects of the invention and further aspects thereof emerge from the example of embodiment described below and are explained with reference to this example of embodiment.

The invention will be further described with reference to examples of embodiment shown in the drawings, to which, however, the invention is not restricted.

Figure 1:
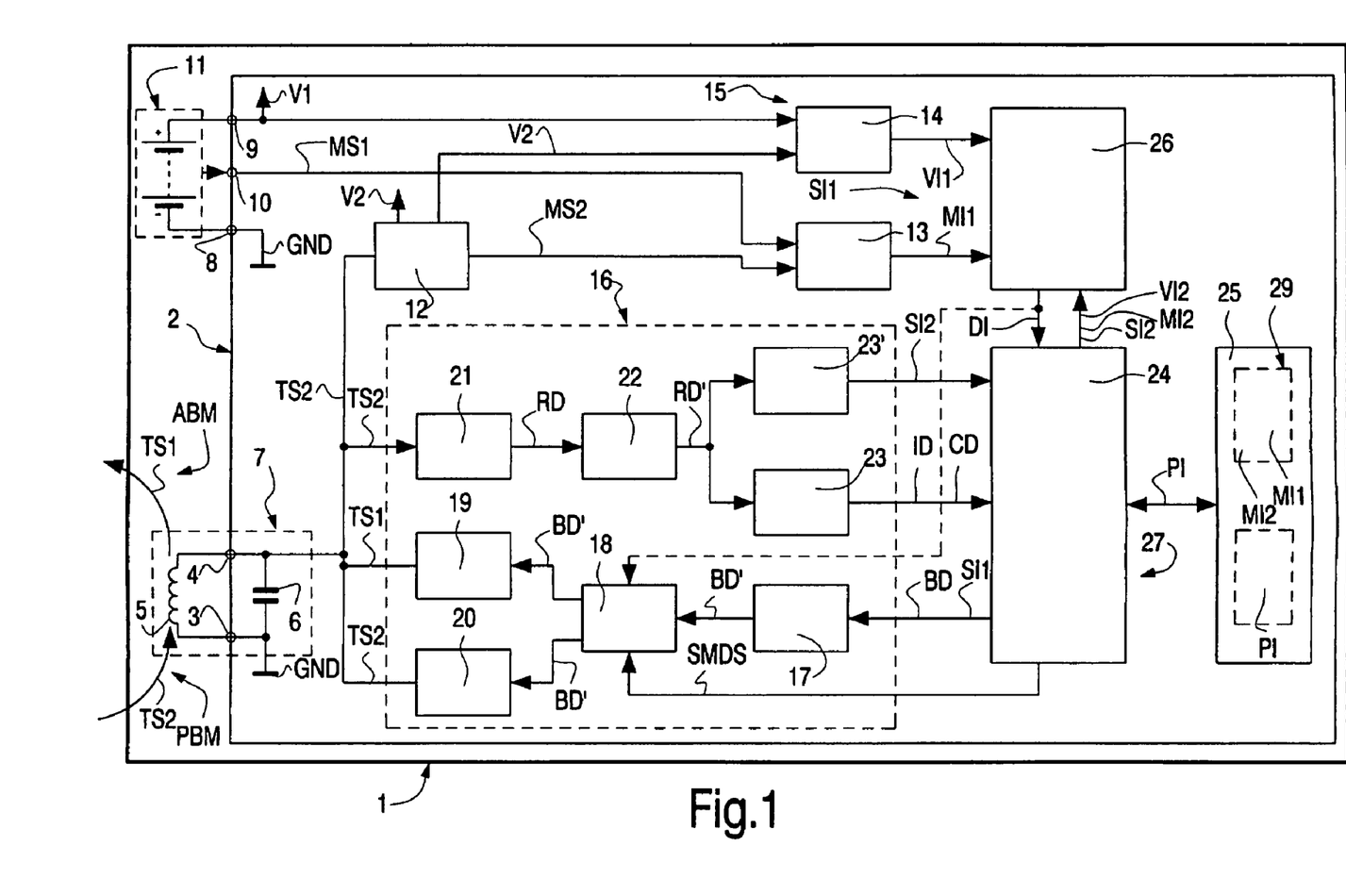
FIG. 1 is a schematic representation, in the form of a block diagram, of a circuit according to the invention in a communication partner appliance.

FIG. 1 shows a communication partner appliance 1, which is designated hereinafter in abbreviated in form as first appliance 1. The first appliance 1 is designed for contactless communication with at least one second such appliance and thus belongs to a communication system comprising at least two such appliances, wherein the second appliance is not illustrated in FIG. 1. The first appliance 1 comprises a circuit 2, in which either an active send mode or a passive send mode may be activated, which will be examined in more detail below. The circuit 2 additionally comprises a first terminal 3 and a second terminal 4, which terminals 3 and 4 form terminal means for the circuit 2, which are provided for the transmission of carrier signals TS1 and TS2 usable for contactless communication, wherein the carrier signal TS1 may be generated by means of the circuit 2 and wherein the carrier signal TS2 may be generated by means of the circuit of the second appliance and may be received by the first appliance 1 and consequently its circuit 2.

The first appliance 1 additionally comprises a transmission coil 5, which is connected at its winding ends respectively to the first terminal 3 and to the second terminal 4. The circuit 2 additionally comprises a capacitor 6, which is connected to the terminals 3 and 4 in parallel with the transmission coil 5. The first terminal 3 is additionally connected to a reference potential GND of the circuit 2. The transmission coil 5 and the capacitor 6 form an oscillating circuit, which forms transmission means 7 of the first appliance 1, by means of which the received carrier signal TS2 may be transmitted to the circuit 2 for the purpose of information transfer and/or energy supply of the circuit 2. By means of the transmission means 7, the first carrier signal TS1 generatable in the circuit 2 may also be transmitted from the circuit 2 to the first appliance 1, such that it may be used with the second appliance for the purpose of information transfer and/or for the purpose of energy supply of the circuit of the second appliance.

The circuit 2 additionally comprises a third terminal 8 and a fourth terminal 9 and a fifth terminal 10, which three terminals 8, 9 and 10 are designed to connect the circuit 2 to a first energy source arranged externally of the circuit 2. In the present case, the first energy source forms a component of the first appliance 1. It should be mentioned, however, that the energy source may also be arranged outside the appliance 1.

The first appliance 1 comprises a battery arrangement 11 as its first energy source, which battery 11 takes the form of two so-called button cells. A positive terminal of the battery arrangement 11 is connected to the fourth terminal 9. A negative terminal of the battery arrangement 11 is connected to the third terminal 8, such that a first supply voltage V1 may be picked off between the two terminals 8 and 9 for the circuit 2. The third terminal 8 is additionally connected to the reference potential GND of the circuit 2. The battery arrangement 11 additionally comprises identification means not illustrated in FIG. 1, which means allow identification of the type of battery arrangement—in the present case two button cells of a particular type. The identification means of the battery arrangement 11 are in contact with the fifth terminal means 10 and are designed to output a first type signal MS1 to the circuit 2, which first type signal MS1 represents the type of battery arrangement 11, i.e. the first energy source.

The circuit 2 additionally comprises a voltage supply stage 12, which is connected to the second terminal 4. The voltage supply stage 12 is designed to generate a second supply voltage V2 relative to the reference potential GND for the circuit 2, using the second carrier signal TS2 transmittable into the circuit 2 by means of the transmission means 7. The voltage supply stage 12 and the transmission means 7 provide a second energy source for the circuit 2. The voltage supply stage 12 is designed to generate and output a second type signal MS2, which second type signal MS2 represents the second energy source type, namely separate-source supply by means of a second carrier signal TS2 generated externally of the circuit 2.

The circuit 2 further comprises a type determination stage 13, which is designed to receive the first type signal MS1 and the second type signal MS2. The type determination stage 13 is additionally designed to evaluate the two received signals MS1 and MS2 and, as a result of the evaluation, to generate and to output first type-information MI1, which first type-information MI1 is characteristic of the type of the two energy sources serving to supply the circuit 2.

The circuit 2 additionally comprises a value determination stage 14, which is designed to receive the first supply voltage V1 produced in the circuit 2 by means of the first energy source and to receive the second supply voltage V2 produced in the circuit 2 by means of the second energy source. The value determination stage 14 is additionally designed to detect the respective value of the supply voltage V1 or V2 and, with the aid of the detected value, to determine and output first value information VI, which first value information VI1 is characteristic of the value of the energy available for supplying the circuit by means of the respective energy source.

The first value information VI1 and the first type information MI1 form first energy source information SI1. The first energy source information SI1 is characteristic of two parameters, namely the type of the first energy source and the value of the energy available from the first energy source serving to supply the circuit 2 with electrical energy. The first energy source information SI1 is additionally characteristic of two parameters, namely the type of the second energy source and the value of the energy available from the second energy source serving to supply the circuit 2 with electrical energy. The type determination stage 13 and the value determination stage 14 form determination means 15 of the circuit 2, which are designed to determine the first energy source information SI1.

It should be mentioned at this point that the value of the energy available is determined in the present case solely on the basis of the respective value of the supply voltages V1 or V2. However, the value of the available energy may also be determined by means of a combination of a value of a supply voltage and a value of a current, which current is associated with one of the energy sources or arises at the respective energy source, as is the case for example in the case of voltage control circuits or current-limiting circuits. Provision may likewise be made for the value of the energy to be determined solely on the basis of a current value of a current arising at one of the energy sources. Provision may additionally be made for the value determination stage 14 to be designed to receive the first type information MI1 or to receive the signals MS1 and MS2 forming the basis of the first type information MI1 and for the value information VI to be determined taking account of the type of energy sources and the supply voltages V1 and V2 which may be picked off instantaneously at the energy sources.

In the present case, the first type signal MS1 is formed by a voltage drop at a resistor unambiguously identifying the battery arrangement 11, which resistor forms the identification means of the battery arrangement 11, i.e. by an analog signal. It should be mentioned, however, that the first type signal MS1 may also be formed by a data signal, which may for example be read out from a memory chip fitted to the battery arrangement or contained therein, wherein in this case the fifth terminal means 10 are advantageously provided by means of a contact field.

The circuit 2 additionally comprises communication signal processing means 16, by means of which the first carrier signal TS1 generated with the communication signal processing means 16 may be used for sending communication when the active send mode is activated and by means of which the second carrier signal TS2 generated by the second appliance and received by the circuit 2 via the terminal means 3 or 4 respectively may be used for sending communication when the passive send mode is activated.

For the purpose of sending communication, the communication signal processing means 16 comprise an encoding stage 17, which is designed to receive send data BD and to encode the send data BD and to output encoded send data BD' representing the send data BD. The communication signal processing means 16 further comprise a data distribution stage 18, which is designed to receive the encoded send data BD' and to receive a send mode defining signal SMDS. The data distribution stage 18 is designed to output the encoded send data BD' either to an active send stage 19 or to a passive send stage 20 as a function of the send mode defining signal SMDS.

The active send stage 19 is designed to generate and to output the first carrier signal TS1 to the transmission means 7, wherein the first carrier signal TS1 comprises signal portions amplitude-modulated as a function of the encoded send data BD' and unmodulated signal portions.

The passive send stage 20 may have fed to it the second carrier signal TS2 generated by means of the second appliance and arising at the transmission means 7 of the circuit 2. The passive send stage 20 is further designed, as a function of the encoded send data BD', to cause load modulation of the second carrier signal TS2, said load modulation being processable in the second appliance, i.e. to produce load-modulated signal portions and non-load-modulated signal portions in the second carrier signal TS2.

The communication signal processing means 16 further comprise a demodulation stage 21, to which the first carrier signal TS1 and the second carrier signal TS2 may be fed. The demodulation stage 21 is designed to generate receive data RD and to output these receive data RD using amplitude-modulated signal portions and unmodulated signal portions contained in the respective carrier signal TS1 or TS2.

The communication signal processing means 16 further comprise a decoding stage 22, which is designed to receive the receive data RD and to decode the receive data RD and to output decoded receive data RD' representing the receive data RD. The communication signal processing stage 16 further comprises an information/command identification stage 23, which is designed for the reception of the decoded receive data RD' and for the identification of information data ID contained in the decoded receive data RD' or of command data CD. The information/command identification stage 23 is additionally designed to output the information data ID received during communication or the command data CD.

The circuit 2 further comprises a sequence control stage 24, which is designed to receive the information data ID and the command data CD and to process these data ID and CD according to its command repertoire. The sequence control stage 24 is additionally designed to receive decision result information DI received during communication, which information DI will be examined in more detail below. The sequence control stage 24 is additionally designed to control the sequence of a communication operation using a communication protocol according to the ECMA-340 standard. The sequence control stage 24 is additionally designed to generate and to output the send mode defining signal SMDS as a function of the decision result information DI.

The circuit 2 further comprises memory means 25, which are provided for storing processing information PI, which arises or is needed in the course of a communication operation.

The sequence control stage 24 is additionally designed for storing or reading access to the processing information PI stored in the memory means 25 and for changing the processing information PI as a function of the course taken by a communication operation.

Using the communication protocol, the circuit 2 is designed to receive by means of the transmission means 7 and the communication means 16 second energy source information SI2 generated externally of the circuit 2, which information SI2 may be transferred from the second appliance by means of one of the two carrier signals TS1 or TS2 respectively into the circuit 2. Like the first energy source information SI1, the second energy source information SI2 is characteristic of at least one parameter of at least one energy source serving to supply the circuit of the second appliance with electrical energy. For the purpose of identification of the external energy source information SI2, the communication processing means 16 comprises an external energy source information identification stage 23', which is designed to identify the external energy source information SI2 in the decoded receive data RD' and to output the identified external energy source information SI2 to the sequence control stage 24. The sequence control stage 24 is additionally designed to forward the external energy source information SI2. Depending on the design of the circuit of the second appliance and depending on the energy source available to the circuit of the second appliance, the second energy source information SI2 may contain second value information VI2 and/or second type information MI2.

The circuit 2 additionally comprises decision means 26, which are designed to produce a decision result taking account of the first energy source information SI1 determined with the determination means 15 and optionally, if the second energy source information SI2 is available, taking account of the second energy source information SI2 available in the circuit 2 but determined in a circuit of the second appliance, which second information SI2 was consequently received by the first appliance 1 in the course of communication with the second appliance and forwarded to the decision means 26 by means of the sequence control stage 24, which decision result influences which send mode is to be activated in the circuit 2 of the first appliance 1. The decision means 26 are further designed to generate and to output to the sequence control stage 24 the decision result information DI, which represents the decision result. Accordingly, the decision means 26 are additionally designed to produce the decision result taking account of the second value information VI2 available in the circuit 2 but determined in the circuit of the second appliance and/or the second type information MI2.

The decision means 26 are additionally designed to communicate the decision result output to the sequence control stage 24 to the second appliance as a component of the send data BD using the sequence control stage 24 and with the aid of the communication processing means 16 and the transmission means 7, such that the decision result may also be taken into account in the second appliance.

The sequence control stage 24 additionally provides control means 27, which are designed to receive the decision result in the form of decision result information DI and which, if according to the decision result the send mode other than the previously activated send mode is to be activated, are designed to terminate the previously activated send mode so terminating the communication protocol used therefor and to activate the send mode to be activated according to the decision result, restarting the stated communication protocol, wherein by the means of the memory means 25 a communication status may be stored in the form of the processing information PI, which status makes it possible, after restarting the stated communication protocol, to continue with the communication at the point at which it was previously interrupted, wherein by means of the send mode defining signal SMDS distribution of the data BD' is optionally changed during the interruption in communication at the data distribution stage 18.

The control means 27 are additionally designed, if according to the decision result the same send mode as the previously activated send mode is to be activated, to maintain the previously activated send mode, terminating and restarting the communication protocol used, wherein, in this case too, by means of the memory means 25 a communication status may be stored in the form of the processing information PI, such that, after restarting the communication protocol, communication may be continued from the point at which it was previously interrupted, wherein by means of the send mode defining signal SMDS distribution of the data BD' is maintained after the interruption in communication at the data distribution stage 18 as it was prior to the interruption in communication.

Accordingly, the influence as to which send mode is to be activated means that other circumstances are also taken into consideration. In the present case, these circumstances are determined by the course of the communication operation according to the stated communication protocol, wherein a change in send mode at the first appliance 1 or at the second appliance inevitably entails termination and restarting of the communication protocol, such that the send mode cannot be changed at an arbitrary time.

According to the above statements, a method of controlling the circuit 2 with regard to its send mode may be performed by means of the circuit 2, in which method the first energy source information SI1 is initially determined by means of the determination means 15, wherein the first value information VI1 contained in the first energy source information SI1 is determined by means of the value determination stage 14 and the first type information MI1 is determined by means of the type determination stage 13.

According to the method, a decision result is then formed, taking account of the first determined energy source information SI1 and optionally additionally taking account of the second energy source information SI2 available in the circuit 2 but determined in the circuit of the second appliance, which decision result has an influence on which send mode is to be activated in the circuit 2 of the first appliance 1. If the second energy source information SI2 is available, the decision result is formed additionally taking account of the second value information VI2, which is contained in the second energy source information SI2 determined in the circuit of the second appliance, and/or taking account of the second type information MI2, which is contained in the second energy source information SI2 determined in the circuit of the second appliance.

The decision result, which is output in the form of the decision result information DI to the sequence control stage 24, is communicated to the second appliance under the control of the sequence control stage 24 and with the aid of the communication processing means 16 and the transmission means 7, such that the decision result may also be taken into account at the second appliance.

In addition, if according to the decision result the send mode other than the previously activated send mode is to be activated, according to the method and with the aid of the control means 27 of the circuit 2 the previously activated send mode is terminated with termination of a communication protocol used therefor and the send mode to be activated according to the decision result is activated with restart of the stated communication protocol. In addition, if according to the decision result the same send mode as the previously activated send mode is to be activated, according to the method and with the aid of the control means 27 the previously activated send mode is maintained with termination and subsequent restart of a communication protocol used.

Figure 2:
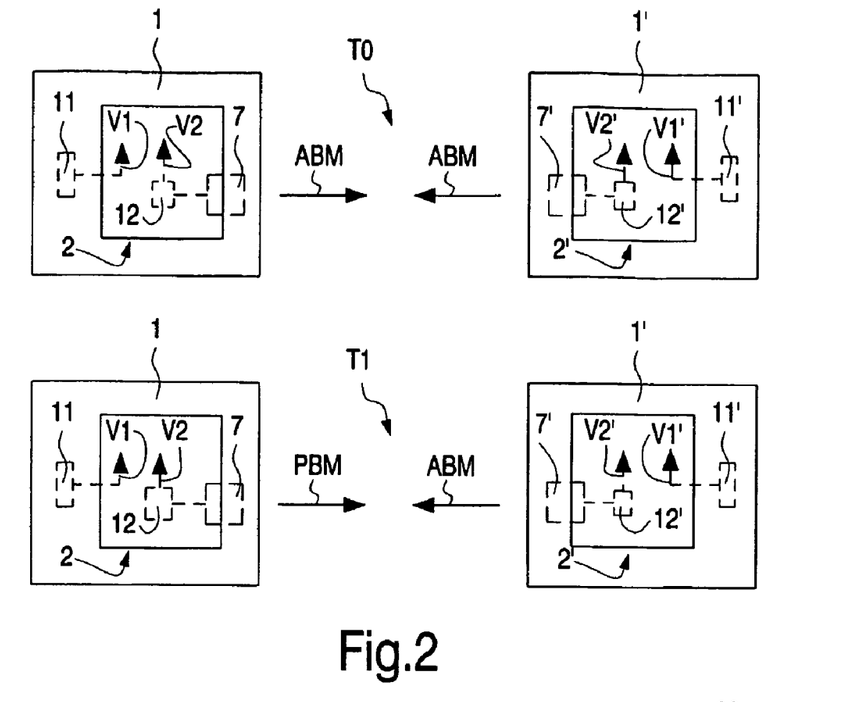
FIG. 2 shows activated send modes in two communication partner appliances each comprising the circuit according to the invention illustrated in FIG. 1 at two points in time during communication between them according to a first example of application of the invention.

Operation of the appliance 1 or the circuit 2 contained therein will now be discussed below with the aid of FIG. 2, with reference to a first example of application for the appliance 1 according to FIG. 1.

According to this example of application, it should be assumed that the first appliance 1, namely a so-called "personal digital assistant", hereinafter abbreviated to PDA, is arranged within a communication zone only a few centimeters in size defined by the ECMA-340 standard in the vicinity of the second appliance 1', which takes the form of a cell phone. The first appliance 1 comprises the circuit 2. The second appliance 1' comprises the circuit 2', which is identical to the circuit 2, wherein all components of the circuit 2' used in connection with the appliance 1' are identified below by the addition of an apostrophe to their reference numerals. To avoid lack of clarity, it should be mentioned at this point that both the cell phone and the PDA comprise further circuits, which are known to the person skilled in the art with regard to the basic operation of the respective product and which are designed for wired communication with the respective circuit 2 or 2' within the respective appliance 1 or 1'. The description of the circuit 2 will not include an examination of these circuits, because they do not constitute part of the invention.

The circuit 2 of the first appliance 1 is connected to the battery arrangement 11, wherein it is assumed, that half of the maximum amount of energy originally storable in the battery arrangement 11 has already been used up. The circuit 2' of the second appliance 1' is connected to a battery arrangement 11', wherein it is assumed that the maximum amount of energy storable is still contained in this battery arrangement 11'.

In addition, it should be assumed that communication between the two circuits 2 and 2' initially starts at a time T0 in such a way that the active send mode is present both in the circuit 2 and in the circuit 2', as is provided according to Chapter 4.1 of the ECMA-340 standard for the active communication mode defined therein. This is indicated in FIG. 2 by the two arrows, which are designated with reference numerals ABM. The first appliance 1 forms the so-called "initiator" according to Chapter 4.6 of the ECMA-340 standard, which starts the communication. The second appliance 1' forms the so-called "target" according to Chapter 4.22 of the ECMA-340 standard.

When the communication has been received, first of all the first energy source information SI1 is generated in the first circuit 2 and the second energy source information SI2 is generated in the second circuit 2'. These two items of information SI1 and SI2 are exchanged between the two circuits 2 and 2' using the communication protocol.

The decision in the form of a decision result is then made in the case of the circuit 2 by means of its decision means 26 and taking account of the two items of energy source information SI1 and SI2 that it is more favorable from the point of view of energy supply to change from the active send mode ABM to the passive send mode PBM, because the second energy source information SI2 indicates a better energy supply situation for the circuit 2' than is indicated by the first energy source information SI1 for the circuit 2.

At roughly the same time, the decision in the form of a decision result is made in the case of the circuit 2' by means of the decision means 26 and taking account of the two items of energy source information SI1 and SI2 that it is more favorable from the point of view of energy supply to maintain the active send mode ABM, because the first energy source information SI1 indicates a less favorable energy supply situation for the circuit 2 than is indicated by the second energy source information SI2 for the circuit 2'.

Then a change is agreed and consequently effected between the circuits 2 and 2' by means of their respective sequence control stages 24 or 24' using the communication protocol from the active communication mode to the passive communication mode defined according to Chapter 4.16 of the ECMA-340 standard, in which passive communication mode the circuit 2 exhibits the passive send mode PBM and the circuit 2' maintains the active send mode ABM. During this procedure, the communication protocol is initially terminated and the respective communication status is stored in the respective memory means 25 or 25'. The send mode of the first circuit 2 is then changed and the communication protocol is subsequently restarted, wherein role reversal takes place between the two appliances 1 and 1' insofar as with the new role allocation the appliance 1' assumes the role of initiator and the appliance 1 the role of target.

At a time T1, the previously interrupted communication is then continued taking account of the stored communication status and of the role reversal.

It should be mentioned at this point that a role reversal may also be dispensed with, depending on the communication protocol used in each case or the communication method.

It should also be mentioned at this point that the respective energy source information SI1 or SI2 may also be generated continuously. This is significant in particular in cases such as here where the energy is supplied by means of batteries, since in the present case the battery 11' provided for supplying the circuit 2' is subject to much more intensive discharge than the battery 11 provided for supplying the circuit 2. In this context, for example, it is possible for the energy source information SI2 or SI1 obtained from the respective circuit 2 or 2' to be buffered in the respective other circuit 2' or 2 and used to generate the decision result, using the energy source information SI1 or SI2 generated continuously in the respective circuit 2 or 2'. Should the decision result change over time, as is to be expected in the present case in the second circuit 2', because its battery 11' is more heavily loaded than that of the first circuit 2, a change in send mode may take place in the two circuits 2 or 2' while maintaining the passive communication mode, which change takes into account the changed charge status of the batteries 11' present after a certain operating period.

Figure 3:
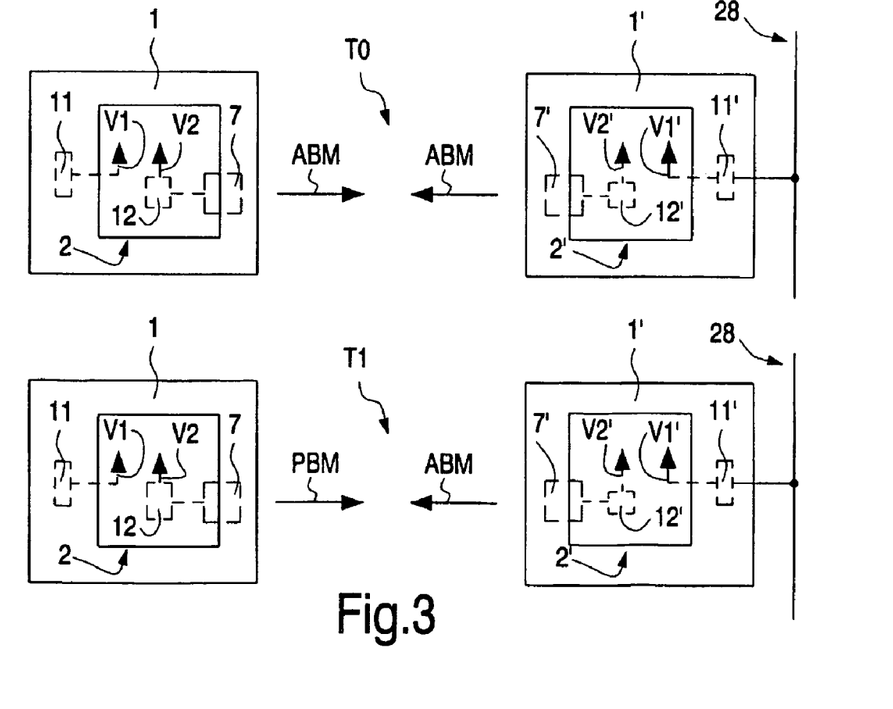
FIG. 3 shows, like FIG. 2, activated send modes in two communication partner appliances each comprising the circuit according to the invention illustrated in FIG. 1 at two points in time during communication between them according to a second example of application of the invention.

Operation of the appliance 1 will now be discussed below with the aid of FIG. 3 with reference to a second example of application for the appliance 1 according to FIG. 1.

In contrast to the example of application discussed above, it should now be assumed that the second circuit 2' of the second appliance 1' is connected to a line energy supply stage, abbreviated to power supply 11", of the appliance 1', wherein this power supply 11" makes available the energy needed for the circuit 2' substantially without time limit when a connection is present to an electrical supply network 28 in the context of the nominal energy requirement of the circuit 2'.

As with the first example of application it should be assumed that at the start of the communication at the time T0 the role allocation identical to the first example of application between the appliances 1 and 1' is present in the active communication mode.

Provided that the power supply of the appliance 1' is connected to the supply network 28, a change from the active communication mode to the passive communication mode present at time T1 also takes place in the present case as in the example of application discussed above and in accordance with the statements made in relation thereto, such that in this case too a role reversal between the appliances 1 and 1' takes place, changing the send mode of the circuit 2 and maintaining the send mode of the circuit 2'.

Figure 4:
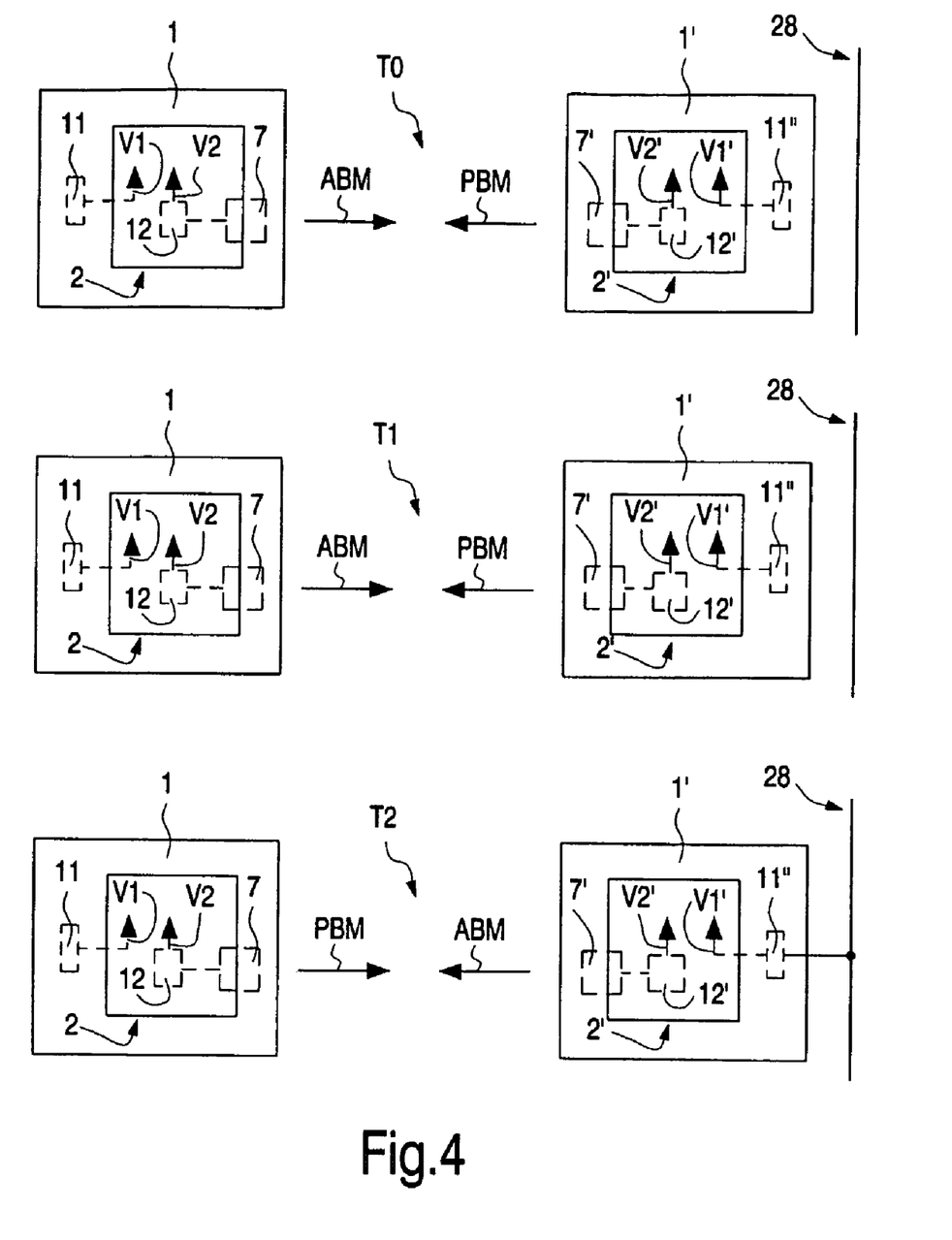
FIG. 4 shows, like FIGS. 2 and 3, activated send modes in two communication partner appliances each comprising the circuit according to the invention illustrated in FIG. 1 at three points in time during communication between them according to a third example of application of the invention.

Operation of the appliance 1 will now be discussed below with the aid of FIG. 4 with reference to a third example of application for the appliance 1 according to FIG. 1.

In contrast to the example of application discussed above, it should now be assumed that the power supply 11" of the appliance 1' is not initially connected to the supply network 28 and that consequently communication starts in the passive communication mode, in which the circuit 2 exhibits its active send mode ABM and the circuit 2' its passive send mode PBM, such that at the time T0 the circuit 2' is supplied with energy by means of the carrier signal generated by the circuit 2.

After determination and exchange of the two items of energy source information SI1 and SI2 and subsequent formation of the respective decision result, in the present case however at the time T1 the passive communication mode is maintained between the two appliances 1 and 1', since there is no possibility for the second appliance 1' of independent electrical supply and it is directed to the energy provided by the first appliance 1 by means of the carrier signal.

However, as soon as the second appliance 1' is connected to the supply network 28, new determination and exchange of the respective energy source information SI1 and SI2 takes place as a consequence of communication between the two appliances 1 and 1'. Thereafter, after formation of the respective decision results and after exchange of the decision results on the basis of the changed energy supply situation, the passive communication mode is maintained, wherein the first circuit 2 changes from its active send mode ABM into its passive send mode PBM and the second circuit 2' changes from its passive send mode PBM into its active send mode ABM, such that a role reversal takes place which is preferred from the point of view of energy supply and which is finally present at the time T2.

It should be mentioned that a further carrier signal in the circuit 2, a so-called "subcarrier signal", may be generated for encoding purposes and supplied to the encoding stage; however this is not a carrier signal for sending communication but rather for encoding.

It should be mentioned that a data distribution stage 18 may be dispensed with in the circuit 2 and that the encoding stage 17 may output the encoded send data BD' directly to the active send stage 19 and the passive send stage 20. In this context, it should further be mentioned that the active send stage 19 and the passive send stage 20 may be designed to receive the send mode defining signal SMDS, wherein the respective send stage 19 or 20 may be activated or deactivated by means of the send mode defining signal SMDS.

It should further be mentioned that, when using a communication protocol, in which an "on the fly" change in send mode may be performed without interruption of the communication protocol, the decision result information DI may be fed directly from the decision means 26 to the data distribution stage 18 instead of the send mode defining signal SMDS generated by means of the sequence control stage 24, because in this case the send mode may be changed directly as a consequence of the presence of the decision result without taking account of the control of the sequence of the communication protocol, i.e. without taking account of further circumstances. In this context it should further be mentioned that if the data distribution stage 18 is omitted the decision result information DI may also be fed directly to the two send stages 19 and 20.

It should be mentioned that, instead of the amplitude modulation, phase modulation or any other type of modulation may also be provided for the purpose of communication.

It should be mentioned that the memory means 25 may also comprise a type information memory area 29, in which the first type information MI1 and the second type information MI2 may be stored, and that in such a case the type determination stage 13 may be provided by means of the sequence control stage 24, wherein the information MI1 and MI2 stored in the memory area 29 is accessed by means of the sequence control stage 24 and the information MI1 and M12 read out therefrom is output to the decision means 26.

In the present case, the determination means 15 and the communication signal processing means 16 and the decision means 26 and the sequence control stage 24 take the form of a hard-wired logic circuit. It should also be mentioned that the means 15, 16 and 26 and the sequence control stage 24 may also take the form of a so-called microcontroller. In such a case, the memory means 25 may also form a component of the microcontroller.

Although in the present case only communication between two communication partners appliances has been examined, it should be mentioned that more than two such communication partner appliances each equipped with the circuit 2 may also be present in such a communication system.

Although in the present case it has always been two energy sources which have been looked at, it should be mentioned that a single energy source or more than two energy sources may also be provided, wherein the determination means 15 and the decision means 26 are designed accordingly to handle this number.

It should further be mentioned that the communication signal processing means 16 may also exhibit a send mode changeover command identification stage, which is designed to identify a send mode changeover command in the decoded receive data RD'. In this connection it should further be mentioned that the circuit 2 may also be designed to generate and, by means of the send data BD, to output such a send mode changeover command. This may be useful if, for example, as shown in FIG. 3, the circuit 2, which is supplied by means of the battery 11, communicates with the circuit 2', which is supplied by means of the power supply 11'. For the circuits 2 and 2', it is expedient in this situation to form the respective decision result taking account of the energy source information SI2 or SI1 generated by the respective other circuit 2' or 2. However, in this situation exchange of the decision results and the subsequent agreement on a change in the send mode of the circuit 2 may be omitted if the circuit 2' transmits the send mode changeover command for the circuit 2 directly after generation of its decision result. This is advantageous because the send mode of the circuit 2 may thereby be changed considerably more quickly and the service life of the battery 11 is thereby increased. In the same way, it is also possible for the circuit 2' to reach its decision result without taking account of the energy source information SI1 generated in the circuit 2 and taking account solely of the energy source information SI2 generated by it itself, since in the present case there is no doubt about the power supply 11" supplying sufficient energy to the circuit 2'.

It should additionally be mentioned that the voltage supply stage 12 may also be omitted in a circuit 2.

It should further be mentioned that the transmission means 7 may also be provided wholly outside the circuit 2. In this context it should further be mentioned that more than two terminals may also be provided in the circuit in order to connect the transmission means 7 to the circuit 2. This is necessary when the transmission coil 5 comprises four terminals for example, wherein a first terminal, namely a center tap, is connected to the reference potential GND of the circuit 2 and wherein a second terminal and a third terminal are used to generate a carrier signal and wherein a fourth terminal is used as a receive terminal. It should further be mentioned that so-called adaptor means may be contained in the transmission means 7.

It should be mentioned that the transmission means 7 may also take the form of an antenna configuration, such as for example a dipole antenna.

The invention claimed is:

1. A circuit for a first communication partner appliance designed for contactless communication within a communication system comprising at least one second communication partner appliance in which circuit either an active send mode or a passive send mode may be activated, the circuit comprising:

terminal means to transmit carrier signals usable for contactless communication;

communication signal processing means to activate an active send mode and a passive send mode, wherein the active send mode uses a carrier signal generated with the communication signal processing means for the contactless communication, and the passive send mode uses a carrier signal generated with a second communication partner appliance and received by the circuit via the terminal means for the contactless communication;

determination means to determine first energy source information which comprises at least one parameter of at least one energy source serving to supply the circuit with electrical energy;

an external energy source information identification stage to identify second energy source information which comprises at least one parameter of at least one energy source serving to supply a circuit of the second communication partner appliance with electrical energy; and decision means to form a decision result based on the first and second energy source information from the first and second communication partner appliances, wherein the decision result influences which send mode is to be activated in the circuit of the first communication partner appliance, and wherein the decision means are designed to communicate the decision result to the second communication partner appliance with the aid of the communication signal processing means.

2. A circuit as claimed in claim 1, wherein the determination means are designed to determine first value information which first value information is characteristic of the value of the energy available for supplying the circuit and which first value information is contained in the first energy source information.

3. A circuit as claimed in claim 1, wherein the at least one energy source serving to supply the circuit of the second communication partner appliance with electrical energy comprises a battery arrangement, and wherein the determination means are designed to determine first type information which first type information is characteristic of the type of battery arrangement serving to supply the circuit and which first type information is contained in the first energy source information.

4. A circuit as claimed in claim 1, wherein the decision means are additionally designed to form the decision result taking account of second value information available in the circuit but determined in the circuit of the second communication partner appliance which second value information is contained in the second energy source information determined in the circuit of the second communication partner appliance.

5. A circuit as claimed in claim 1, wherein the at least one energy source serving to supply the circuit of the first communication partner appliance with electrical energy comprises a second battery arrangement, and wherein the decision means are additionally designed to form the decision result taking account of second type information available in the circuit but determined in the circuit of the second communication partner appliance which second type information is characteristic of the type of the second battery arrangement serving to supply the circuit of the second communication partner appliance and which second type information is contained in the second energy source information determined in the circuit of the second communication partner appliance.

6. A circuit as claimed claim 1, further comprising control means to receive the decision result and, if according to the decision result the send mode other than the previously activated send mode is to be activated, to terminate the previously activated send mode, thus terminating a communication protocol, and to activate the send mode to be activated according to the decision result with a restart of the communication protocol.

7. A circuit as claimed in claim 1, further comprising control means to receive the decision result and, if according to the decision result the same send mode as the previously activated send mode is to be activated, to maintain the previously activated send mode, with termination and subsequent restart of a communication protocol.

8. A communication partner appliance having a circuit as claimed in claim 1.

9. A method of controlling a send mode of a circuit for a first communication partner appliance designed for contactless communication, which first communication partner appliance belongs to a communication system comprising at least one second such communication partner appliance and which circuit comprises terminal means which are provided to transmit carrier signals usable for contactless communication, and in which circuit either an active send mode or a passive send mode may be activated, the method comprising:

determining first energy source information which comprises at least one parameter of at least one energy source serving to supply the circuit with electrical energy;

receiving second energy source information which comprises at least one parameter of at least one energy source sewing to supply a second communication partner appliance with electrical energy;

forming a decision result based on the first and second energy source information from the first and second communication partner appliances;

communicating the decision result to the second communication partner appliance; and activating the active send mode or the passive send mode in the circuit of the first communication partner appliance in response to the decision result, wherein the active send mode uses a carrier signal generated by the circuit for the contactless communication, and the passive send mode uses a carrier signal received by the circuit for the contactless communication.

10. A method as claimed in claim 9, wherein determining the first energy source information comprises determining first value information, which first value information is characteristic of the value of the energy available for supplying the circuit sand which first value information is contained in the first energy source information.

11. A method as claimed in claim 9, wherein the at least one energy source serving to supply the circuit of the second communication partner appliance with electrical energy comprises a battery arrangement, and wherein determining the first energy source information comprises determining a first type information, which first type information is characteristic of the type of battery arrangement serving to supply the circuit and which first type information is contained in the first energy source information.

12. A method as claimed in claim 9, wherein the second energy source information comprises second value information available in the circuit but determined in the circuit of the second communication partner appliance, wherein the second value information relates to a value of an electrical parameter of the at least one energy source of the second communication appliance.

13. A method as claimed in claim 9, wherein the at least one energy source serving to supply the circuit of the first communication partner appliance with electrical energy comprises a second battery arrangement, and wherein the second energy source information comprises second type information available in the circuit but determined in the circuit of the second communication partner appliance, wherein the second type information relates to a type of the second battery arrangement of the second communication appliance.

14. A method as claimed in claim 9, farther comprising communicating the decision result to the second communication partner appliance.

15. A method as claimed in claim 9, wherein, if according to the decision result the send mode other than the previously activated send mode is to be activated, the method farther comprises:

terminating the previously activated send mode through termination of a communication protocol; and activating the send mode to be activated according to the decision result with a restart of said communication protocol.

16. A method as claimed claim 9, wherein, if according to the decision result the same send mode as the previously activated send mode is to be activated, the method farther comprises maintaining the previously active send mode through termination and subsequent restart of a communication protocol.

17. A circuit as claimed in claim 1, wherein the decision means is further configured to receive a second decision result from the second communication partner appliance, wherein the second decision result influences which send mode is to be activated in the circuit of the second communication partner appliance and also influences which send mode is to be activated in the circuit of the first communication partner appliance.

18. A circuit as claimed in claim 17, wherein the decision means is further configured to form the decision result in agreement with the second communication partner appliance subsequent to:

transmission of the decision result of the first communication partner appliance to the second communication partner appliance; and reception of the second decision result of the second communication partner appliance from the second communication partner appliance.

19. A method as claimed in claim 9, further comprising:

receiving a second decision result from the second communication partner appliance, wherein the second decision result influences which send mode is to activated in the circuit of the second communication partner appliance; and forming the decision result additionally based on the second decision result from the second communication partner appliance.

20. A method as claimed in claim 9, wherein forming the decision result further comprising forming the decision result in agreement with the second communication partner appliance subsequent to:

transmitting the decision result of the first communication partner appliance to the second communication partner appliance; and receiving the second decision result from the second communication partner appliance.

* * * * *